Aug. 19, 1958  H. J. M. FÖRSTER  2,848,057
AUTOMATIC DOOR LOCKING DEVICE FOR VEHICLES
Filed Jan. 15, 1954
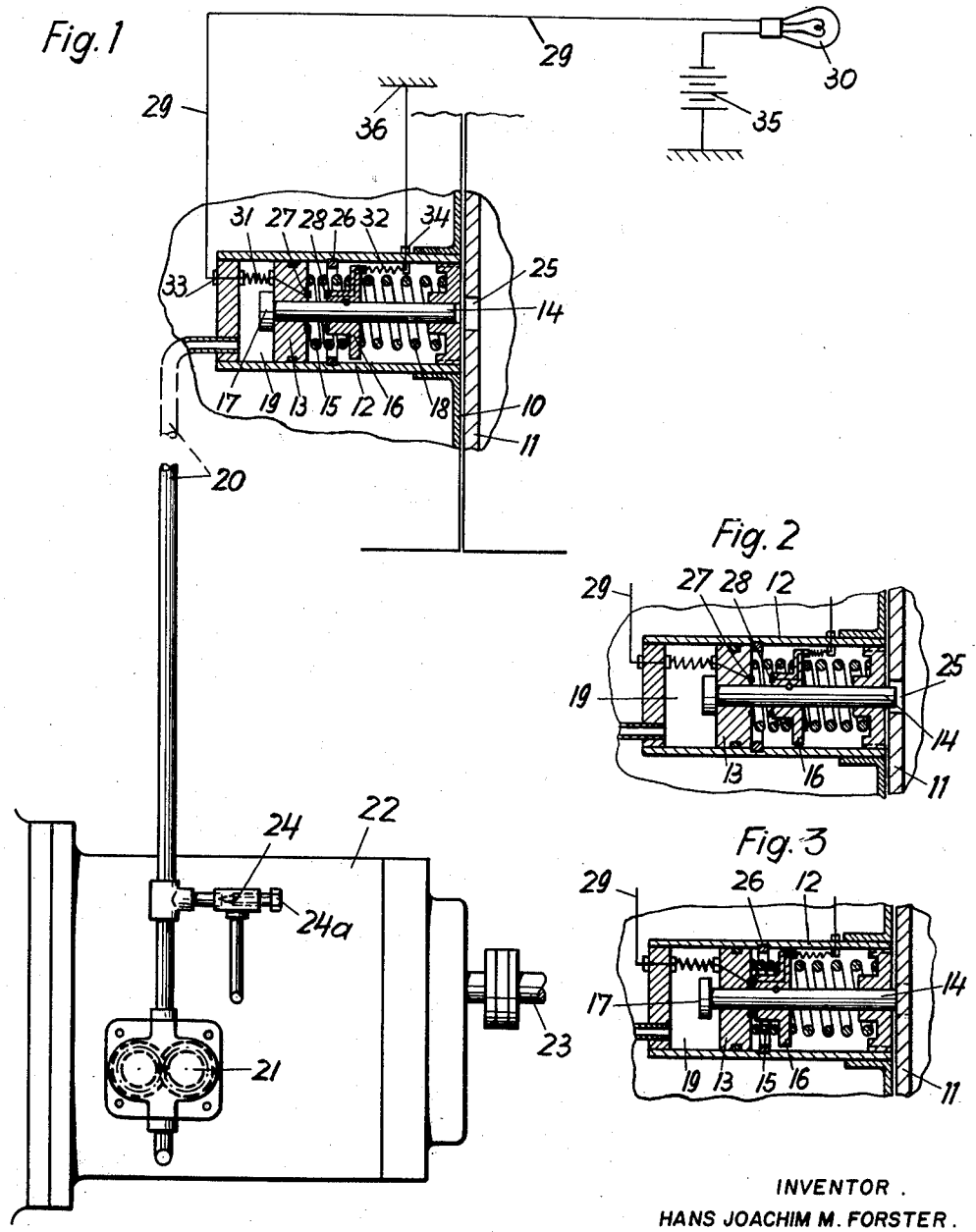
INVENTOR.
HANS JOACHIM M. FORSTER.
BY Dicke and Craig.
ATTORNEYS.

United States Patent Office 2,848,057
Patented Aug. 19, 1958

2,848,057

AUTOMATIC DOOR LOCKING DEVICE FOR VEHICLES

Hans Joachim M. Förster, Stuttgart-Bad Cannstatt, Germany, assignor to Daimler-Benz Aktiengesellschaft, Stuttgart-Unterturkheim, Germany Application January 15, 1954, Serial No. 404,357

Claims priority, application Germany January 17, 1953

6 Claims. (Cl. 180—82)

This invention relates to a locking device for vehicles, particularly motor vehicles. The invention has as one of its objects to provide increased safety from accidents due to unintentional opening of a vehicle door, particularly for the persons in the vehicle. Another object of the invention is to prevent unintentional opening of the door while the vehicle is moving, particularly at high speeds.

An essential feature of the invention, therefore, is the automatic locking of the door while the vehicle is moving or as it exceeds a certain traveling speed.

The locking of the door is conveniently arranged not in a positive, but in a non-positive manner enabling, in particular, the door to be opened with certainty during failures of the hydraulic oil pressure or in case of accidents. The locking may be achieved by means of a hydraulic, pneumatic or electrical auxiliary force, as by a locking piston moved against spring power. The hydraulic oil pressure employed for this purpose is conveniently produced by an oil pump driven from the gear box or the output shaft thereof or otherwise driven by the vehicle.

A further object of the invention is to provide a warning signal arrangement being operated if the door is not properly locked.

The invention is more particularly described with reference to the accompanying drawings which show in diagram an embodiment of the invention in which:

Figure 1 shows the locking device with the door unlocked;

Figure 2 shows the device with the door locked; and

Figure 3 shows the device with the locking mechanism blocked.

Reference numeral 10 indicates the fixedly arranged door frame, 11 the door, 12 the locking cylinder in which slides a piston 13. A locking pin 14 is non-positively connected to the piston 13 by means of a spring 15 which rests against the piston 13, on the one hand, and, on the other, against a sleeve 16 which is fixedly arranged on the locking pin 14, the spring 15 pressing the piston 13 against a stop 17 on the locking pin 14. The locking pin 14, and consequently, via the spring 15, the piston 13, are weighted by a spring 18 so that said two members are pressed as a single unit toward the left. It is understood that the spring tension of spring 15 is greater than that of spring 18.

Oil is supplied to the pressure chamber 19 through a pipe 20 from an oil pump 21 accommodated, for example, in or adjacent the change-speed gear 22 of the motor vehicle and which has a constant driving connection from the output shaft 23, leading to the road wheels, said driving connection being made either directly, or indirectly through gear reductions. The pump may supply additional oil, for example, by returning the oil to the sump of the speed gear, as through a throttle 24 which can be adjusted by means of the screw 24a.

While the door is in the closed position, the locking pin 14 is faced by an opening 25 in the door wall which the locking pin 14 may engage thereby locking the door. The stroke of the piston 13 therewith of the locking pin 14 is limited toward the right by the stop 26, which may be a piston ring or the like.

Arranged on the piston 13 and the sleeve 16 are contacts 27 and 28 which are connected through appropriate connections 31 and 32 to terminals 33 and 34, terminal 33 being connected through a lead 29 to the warning lamp 30 connected, on the other hand, to a source of current 35, and terminal 34 being connected to the ground of the vehicle, as at 36.

Referring to Fig. 1, it is understood that the vehicle is stationary or is traveling at low speed, and that, therefore, the oil pump 21 also is stationary or is driven at comparatively low speed. At a given pressure, i. e., at a given traveling speed of, say, 6 to 9 miles per hour, determined, for example, by the throttle 24, the pressure oil flowing into the piston chamber 19 and acting as a servo medium will overcome the opposing action of the spring 18 thereby causing the locking pin 14 subjected partly directly, but for the most part through the piston 13, to the pressure of the servo medium to engage the lock opening 25 in the door thereby locking the door (Fig. 2).

If the door has not been fully closed, the locking pin 14 strikes against the outer surface of the door without being able to engage the opening 25. As this causes the pressure in the piston chamber 19 to rise still further, the action of the spring 15 also is overcome and the piston 13 lifted off its stop 17 until it comes to rest against the sleeve 16 (Fig. 3). As a result thereof a contact is established thereby between contacts 27 and 28, the warning lamp which may be disposed, for example, in front of the driver's seat, will light up thereby indicating to the driver that the door has remained unlocked due to the incorrect closing thereof. The warning lamp may be replaced by a luminous lettering, acoustic signal or the like.

As the car is being stopped or the traveling speed drops below a certain figure, the pressure in the pipe 20 and the piston chamber 19 will drop below the previously determined amount thereby causing the spring 18 to withdraw the piston 13 and locking pin 14 again from the opening 25 and to release the door for re-opening.

Alternatively, the locking device may be arranged in the door instead of in the stationary portion of the door frame, and may engage a corresponding recess in the door frame.

What I claim is:

1. A locking device for hinged vehicle doors comprising hinge means for the door at one side thereof, a movable locking pin member disposed in the vehicle door for locking the door in the closed position thereof upon axial movement thereof into an aperture provided in a relatively fixed part of the vehicle, said locking pin member being located at a side of said door other than said one side, means for supplying a hydraulic servo-power medium in dependence on the travelling speed of the vehicle, means for moving said locking pin member into locking position comprising a first member and a second member, said first member being carried by said locking pin member, said second member being disposed slidably on said locking pin member, force transmitting means including yieldable means disposed between said second member and said locking pin member, means for applying said hydraulic servo-power medium directly to said first and second members including a cylinder having a chamber therein for receiving said hydraulic servo-power medium, said first and second members constituting one wall of said chamber, and spring means tending to withdraw said locking member out of said aperture to disengage said locking member from the locking position thereof, both of said first-mentioned means and said spring means being chosen with respect to each other to move said locking member into said locking position predominantly under the effect of said servo-power medium upon exceeding a predetermined speed and for returning said locking member into the unlocking position thereof predominantly under the effect of said spring means as the travelling speed falls below a predetermined value.

2. A locking device for vehicle doors comprising a movable locking member for locking the door in the closed position thereof, means for supplying a hydraulic servo-power medium in dependence on the travelling speed of the vehicle, means for applying said hydraulic servo-power medium to said locking member to operate said locking member in the locking direction thereof, spring means tending to disengage said locking member from the locking position thereof, both of said first-mentioned means and said spring means being chosen with respect to each other to move said locking member into said locking position predominantly under the effect of said servo-power medium upon exceeding a predetermined speed and for returning said locking member into the unlocking position thereof predominantly under the effect of said spring means as the travelling speed falls below a predetermined value, a warning signal arrangement, said second-mentioned means including a cylinder, a piston coaxial with and axially movable relative to said locking member, said servo-power medium being operative on said piston, a stopping member on said locking member, spring means between said piston and said stopping member tending to move said locking member by said servo-power medium into said locking position through said piston and said last-named spring means, said last-named spring means being of a higher spring tension than said first-named spring means thereby causing said piston to be moved relative to said locking member toward said stopping member against the action of said last-named spring means, and contact means on said piston and stopping member to actuate said warning signal arrangement as said piston approaches said stopping member.

3. A locking device as claimed in claim 2, comprising a stop on the locking member, against which the piston is pressed by the last-named spring means, and another stop on the cylinder for limiting the stroke of the piston against the action of both said first- and said last-named spring means.

4. A locking device for vehicle doors, comprising a movable locking member for locking the door in a closed position thereof, means for supplying a servo power medium dependent upon the traveling speed, means for causing said servo power medium to act upon said locking member in the locking direction thereof in such a manner as to move the locking member into locking position predominantly under the effect of said servo power medium as a predetermined traveling speed is exceeded, spring means tending to move the locking member into unlocking position as the traveling speed falls below a predetermined figure, said second-mentioned means including a cylinder, a piston coaxial with and axially movable in relation to said locking member, said servo power medium acting upon said piston, a stopping member on said locking member, spring means between said piston and said stopping member, to make said servo power medium tend to cause said locking member through the intermediary of said piston and last-named spring means to move into locking position in such a manner as to cause the piston to be pushed relative to the locking member toward the stopping member against the action of the last-named spring means when said locking member is stopped by the door, a warning signal arrangement, and contact means on said piston and stopping member to actuate said warning signal arrangement as the piston approaches the stopping member.

5. A locking device for hinged vehicle doors comprising hinge means for the door at one side thereof, a movable locking pin member disposed in the vehicle door for locking the door in the closed position thereof upon axial movement thereof into an aperture provided in a relatively fixed part of the vehicle, said locking pin member being located at a side of said door other than said one side, means for supplying a hydraulic servo-power medium in dependence on the travelling speed of the vehicle, means for applying said hydraulic servo-power medium to said locking pin member to operate said locking pin member in the axial locking direction thereof, and spring means tending to withdraw said locking member out of said aperture to disengage said locking pin member from the locking position thereof, both of said first-mentioned means and said spring means being chosen with respect to each other to move said locking pin member into said locking position predominantly under the effect of said servo-power medium upon exceeding a predetermined speed and for returning said locking pin member into the unlocking position thereof predominantly under the effect of said spring means as the travelling speed falls below a predetermined value, said means for applying the hydraulic servo-power medium to said locking pin member including a cylinder with a piston therein, said piston being provided with an aperture therethrough, said locking pin member extending through said aperture, said piston being slidable on said locking pin member, and said hydraulic servo-power medium within said cylinder acting directly upon said piston and upon said locking pin member.

6. A locking device for vehicle doors, comprising a movable locking member for locking the door in a closed position thereof, means for supplying a servo power medium dependent upon the traveling speed, means for causing said servo power medium to act upon said locking member in the locking direction thereof in such a manner as to move the locking member into locking position predominantly under the effect of said servo power medium as a predetermined traveling speed is exceeded, spring means tending to move the locking member into unlocking position as the traveling speed falls below a predetermined figure, said second-mentioned means including a cylinder, a piston coaxial with and axially movable in relation to said locking member, yielding means between said piston and said locking member opposing relative axial movement therebetween, contact means on said piston and locking member adapted to be brought into contact to actuate a warning signal when said yielding means is overcome, said yielding means being overcome when the door is not in a fully closed position.

References Cited in the file of this patent

UNITED STATES PATENTS

| | | |
|---|---|---|
| 1,991,611 | Gano | Feb. 19, 1935 |
| 2,142,403 | McCullough | Jan. 3, 1939 |
| 2,185,909 | Caponey | Jan. 2, 1940 |
| 2,250,014 | FitzGerald | July 22, 1941 |
| 2,314,815 | Brandt | Mar. 23, 1943 |
| 2,437,992 | Bennett | Mar. 16, 1948 |
| 2,624,613 | Parmely | Jan. 6, 1953 |
| 2,647,789 | Chayne | Aug. 4, 1953 |
| 2,674,334 | Uberbacher | Apr. 6, 1954 |